United States Patent
Nairn et al.

(10) Patent No.: US 9,477,843 B2
(45) Date of Patent: Oct. 25, 2016

(54) INHIBITING ACCESS TO SENSITIVE VEHICLE DIAGNOSTIC DATA

(71) Applicant: GM Global Technology Operations LLC, Detroit, MI (US)

(72) Inventors: David M. Nairn, Plymouth, MI (US); Stephan Huang, Carmel, IN (US); Muralikrishnan K, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/302,162

(22) Filed: Jun. 11, 2014

(65) Prior Publication Data

US 2015/0363606 A1    Dec. 17, 2015

(51) Int. Cl.
*G01M 17/00* (2006.01)
*G06F 21/62* (2013.01)
*G06F 21/78* (2013.01)

(52) U.S. Cl.
CPC ........... *G06F 21/6218* (2013.01); *G06F 21/78* (2013.01)

(58) Field of Classification Search
CPC ............. G06F 21/6218; G06F 21/554; G06F 21/557; G06F 2221/034
USPC ....................................................... 701/29.6
See application file for complete search history.

(56) References Cited

U.S. PATENT DOCUMENTS

| | | | | |
|---|---|---|---|---|
| 7,856,299 B2* | 12/2010 | Fink | ..................... | G01R 31/007 701/31.4 |
| 8,090,495 B2* | 1/2012 | Fink | ..................... | G01R 31/007 701/33.2 |
| 2005/0025289 A1* | 2/2005 | Hogdahl | ............... | B60R 25/102 379/37 |
| 2007/0043951 A1* | 2/2007 | Grill | ....................... | G06F 21/64 713/176 |
| 2008/0211648 A1* | 9/2008 | Salm | ........................ | G07C 5/00 340/441 |
| 2009/0030570 A1* | 1/2009 | Regnard De Lagny | .................. | G07C 5/0816 701/33.4 |
| 2012/0105067 A1* | 5/2012 | Makarewicz | ...... | G01R 31/3627 324/427 |
| 2012/0110296 A1* | 5/2012 | Harata | .................... | G06F 12/06 711/203 |
| 2013/0111582 A1* | 5/2013 | Forest | ..................... | G06F 21/44 726/19 |
| 2013/0226445 A1* | 8/2013 | Nagata | .................. | B60W 30/12 701/300 |

OTHER PUBLICATIONS

NPL:Unified Diagnostic Service; Date:N/A.*

* cited by examiner

*Primary Examiner* — Ian Jen
(74) *Attorney, Agent, or Firm* — Christopher DeVries; Reising Ethington P.C.

(57) ABSTRACT

A vehicle system and method of secure communication between a vehicle and an external device communicating with the vehicle in a diagnostics mode. The method includes the steps of: receiving a first diagnostic request at an electronic control unit (ECU) from the external device; determining an increased risk of security breach at the ECU based on the [nature of the] first request; and when it is determined that the increased risk exists, providing a misinformative response.

16 Claims, 4 Drawing Sheets

INHIBITING ACCESS TO SENSITIVE VEHICLE DIAGNOSTIC DATA

TECHNICAL FIELD

The present invention relates to providing secure vehicle diagnostic services.

BACKGROUND

The International Standard Organization (ISO) is a recognized authority for industry standards. ISO-14229 specifies data link requirements of diagnostic services allowing a diagnostic tester or test equipment to control diagnostic functions in a vehicle electronic control unit (ECU); e.g., ECUs associated with electronic fuel injection, automated gear box assemblies, anti-lock braking systems, etc. When the diagnostic test equipment interfaces with one or more ECUs, the test equipment controls communication over the data link—e.g., whether the communication is to stop, pause, or resume.

SUMMARY

According to an embodiment of the invention, there is provided a method of secure communication between a vehicle and an external device communicating with the vehicle in a diagnostics mode. The method includes the steps of: receiving a first diagnostic request at an electronic control unit (ECU) from the external device; determining an increased risk of security breach at the ECU based on the first request; and when it is determined that the increased risk exists, providing a misinformative response.

According to another embodiment of the invention, there is provided a method of secure communication between a vehicle electronic control unit (ECU) and an external device communicating with the ECU in a diagnostics mode. The method includes the steps of: preconfiguring a static, misinformative response to a diagnostic request for sensitive data; receiving a first diagnostic request, the first diagnostic request being at least a portion of a malicious attack; determining that the first diagnostic request is for the sensitive data; and providing the misinformative response.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method(s) described below pertain to vehicle security with respect to a vehicle diagnostics system. More particularly, the method(s) pertain to protecting or securing sensitive information carried by or stored by electronic control units (ECUs) within the vehicle from malicious attackers. The ECUs are typically interconnected to one another and communicate with one another via a vehicle network (e.g., a bus using a controller area network (CAN) protocol). In addition, the ECUs may abide by and/or comply with a vehicle diagnostics protocol. More recently, malicious attackers have determined how to manipulate the diagnostics protocol to access the sensitive information carried by the ECU(s). As will be explained below, using this sensitive information, malicious attackers may access the vehicle without authorization, start the vehicle without authorization, control vehicle movement without authorization, or access a lawful user's private information without authorization, just to name a few examples.

Figure 1:
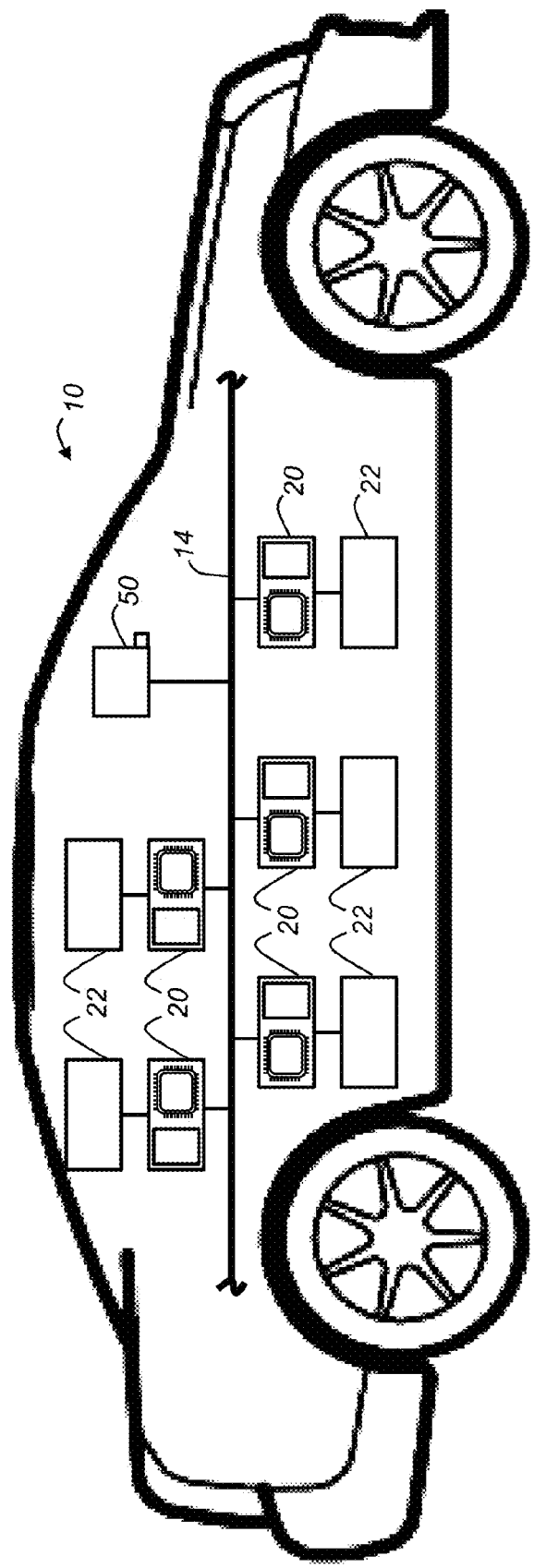
FIG. 1 is a schematic diagram depicting an embodiment of a vehicle communications system.

FIG. 1 illustrates a vehicle 10 having a communication system 12 therein. The communication system 12 may enable wired communication via one or more vehicle buses 14, short range wireless communication (SRWC) using an SRWC chipset 16 (see FIG. 2), or long range, cellular communication using a cellular chipset 18 (see FIG. 2), just to name a few possibilities. The bus(es) 14 and SRWC equipment collectively may be implemented to enable a vehicle local area network (VLAN).

The one or more buses 14 may include communication bus(es), infotainment bus(es), entertainment bus(es), etc. The bus shown in FIG. 1 is connected directly and indirectly to multiple devices. For example, a number of ECUs (20) are coupled to the bus 14, which are in turn each coupled to a vehicle module or device 22. Together the bus(es) 14 and ECUs 20 communicate via one or more vehicle networks (e.g., suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few).

Figure 2:
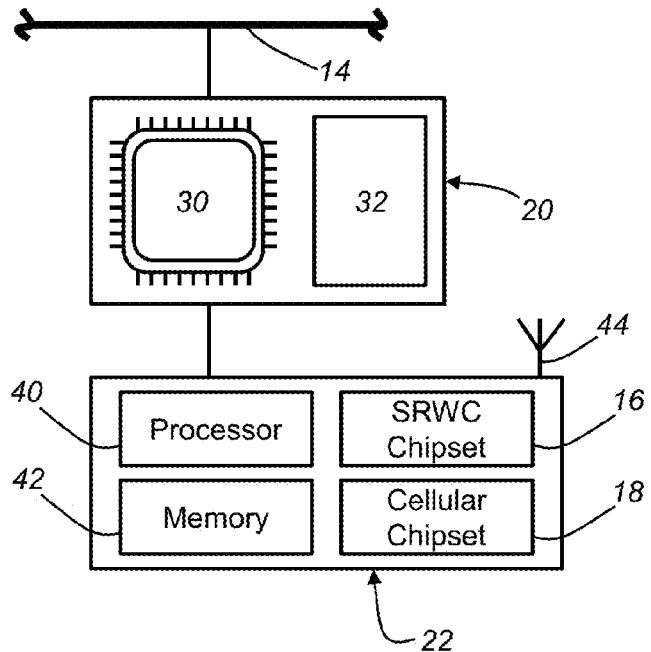
FIG. 2 is an embodiment of a portion of the vehicle communications system shown in FIG. 1.

Each ECU may comprise one or more processing devices or processors 30 and memory or memory devices 32 (see e.g., FIG. 2). Each processor 30 may be any type of device capable of processing electronic instructions including microprocessors, microcontrollers, host processors, controllers, vehicle communication processors, and application specific integrated circuits (ASICs). It can be a dedicated processor used only for the respective ECU (and/or its respective vehicle module 22) or it can be shared with other vehicle systems. Processor 30 executes various types of digitally-stored instructions, such as software or firmware programs stored in memory 32, which enable the vehicle module 22 to provide various services. For instance, processor 30 can execute programs or process data to carry out at least a part of the method discussed herein.

The memory 32 may include any suitable computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes.

Figure 3:
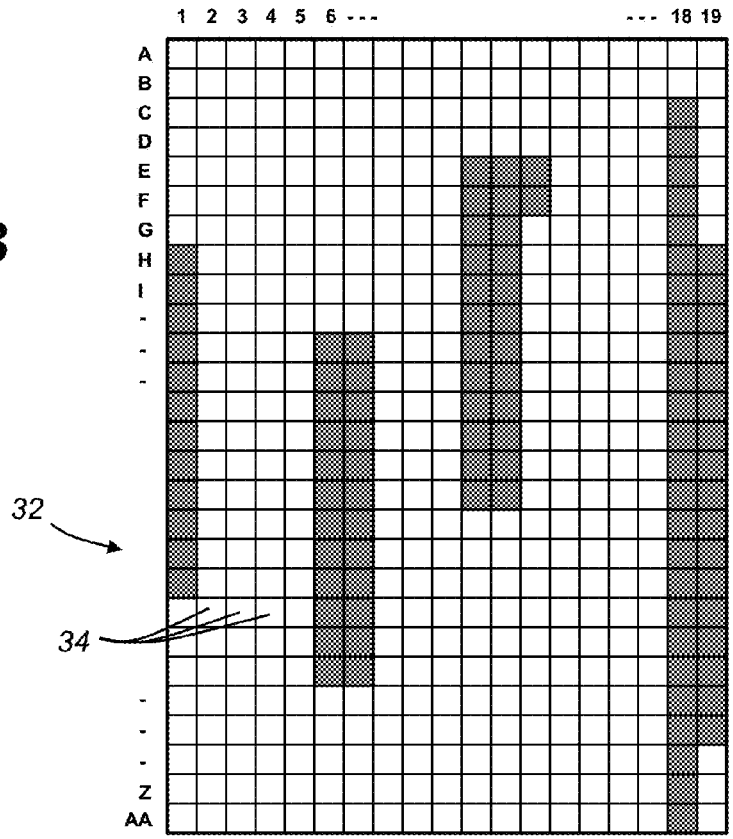
FIG. 3 is an embodiment of electronic control unit (ECU) memory.

According to one embodiment, the memory 32 may be categorized or divided into identifiable segments—each segments having or being associated with a cell or address 34 (see FIG. 3). FIG. 3 shows at least a portion of memory 32 having multiple addresses 34. For purposes of illustration only, FIG. 3 shows rows (indicated alphabetically, e.g., A-AA) and columns (indicated numerically, e.g., 1-19). These quantities of rows and columns are merely an example; other quantities exist. Moreover, other means of addressing the memory 32 also exist. As will be explained in greater detail below, memory 32 may carry or store both sensitive and non-sensitive data; e.g., in FIG. 3, the shaded addresses (e.g., H1, I1, J1 , . . . , S1) may carry sensitive data, while the unshaded addresses (e.g., all of columns 2, 3, 4, and 5) may carry less or non-sensitive data.

It also should be appreciated that the addresses 34 may be configured in or using hardware or software. For example, where the addresses are configured in software, the method(s) may be performed as one or more computer programs executable by the processor 30 and/or the vehicle module 22, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. It is therefore to be understood that the methods may be at least partially performed by any electronic device(s) capable of executing the above-described functions.

One of the vehicle modules 22 may be a telematics unit (as shown in FIG. 2) having the previously mentioned SRWC and cellular chipsets 16, 18, as well as its own processor 40, memory 42, and multi-purpose (or multi-band) antenna 44—among other things. For example, using the SRWC chipset 16, the telematics unit may carry out wireless networking (via the VLAN) according to any suitable, known protocol. Non-limiting examples of SRWC protocols include any suitable Wi-Fi standard (e.g., IEEE 802.11), Wi-Fi Direct or other suitable peer-to-peer standard, Bluetooth, WiMAX, ZigBee™, wireless infrared transmission, or various combinations thereof.

Of course, wireless networking by the telematics unit may be carried out according to any suitable cellular standard as well. For example, the telematics unit may communicate via GSM, CDMA, or LTE standards, just to name a few. Cellular communication should be construed broadly to include voice calls, data (or packet) calls, or any combination thereof.

The ECU 20 shown in FIG. 2 is coupled between the bus 14 and the telematics unit (one of the modules 22) and may be configured according to any suitable standard—e.g., having a generic configuration; or it may be a dedicated, specially configured ECU. Thus, the ECU 20 shown in FIG. 2 is illustrative of any or all of the ECUs shown in FIG. 1. It should be appreciated that the ECU 20 may carry sensitive data associated with communication over the bus 14 or sensitive data associated with the respective module 22 (e.g., the telematics unit) or both. For example, the ECU 20 may carry one or more encryption keys for secure bus communication or for communication between the ECU 20 and the respective module 22. Furthermore, skilled artisans will appreciate that a breach of ECU 20 may enable an attacker a suitable opportunity to acquire sensitive data stored within the module 22. For example, a breach of the ECU 20 of FIG. 2 may enable a malicious attacker opportunity to use the telematics unit to remotely start the vehicle or unlock the vehicle doors, etc.

Figure 4:
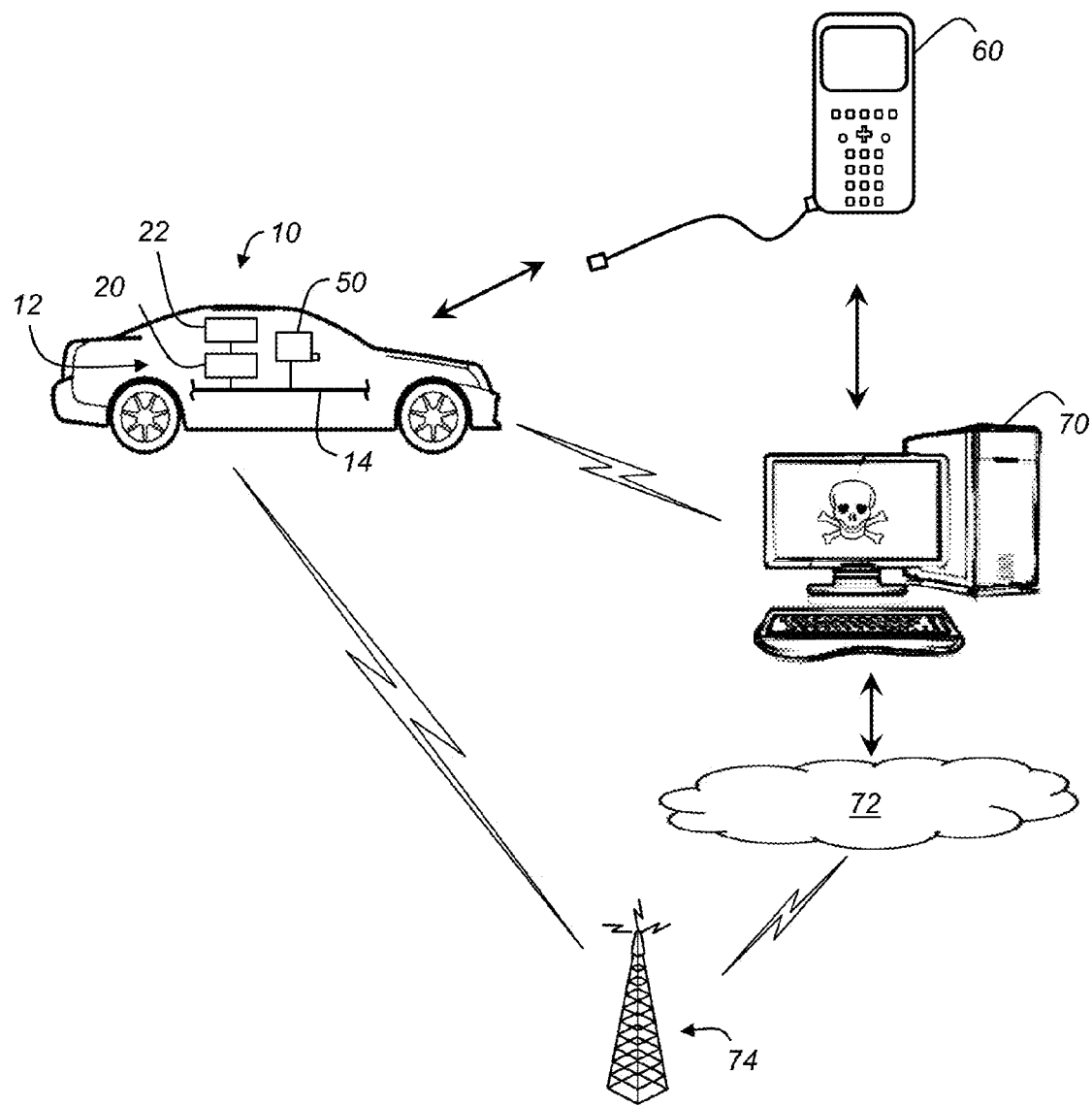
FIG. 4 is a schematic diagram depicting how a malicious attacker might breach the vehicle communications system of FIG. 1.

FIG. 4 (and also FIG. 1) show a diagnostic portal 50 coupled to the bus 14. The portal 50 may be any device for connecting or coupling an external device 60 such as a diagnostic tool or data-logger or other suitable diagnostics machine. In addition, as will be explained in greater detail below, external devices 60 also may include electronic devices used by an attacker to imitate genuine diagnostic tools; e.g., a pseudo-diagnostic tool or remote computer. Genuine diagnostic tools (60), as will be appreciated by skilled artisans, may enable a vehicle technician to connect with the vehicle 10, request diagnostic status, and read the statuses of multiple vehicle modules 22. The diagnostic request may be a memory-read request (e.g., per ISO-14299, a Read_Memory_by_Address request). Where a technical issue or problem exists with a particular module, the status provided by the associated ECU 20 includes ERROR code data or a diagnostic trouble code (DTC). And where no issues exists, the status includes NORMAL code data. Thus it will be appreciated that similar attacker-used (or hijacked) diagnostic tools perform similar functions. The external device 60 may couple by wire or wirelessly with the portal 50 using hardware and techniques familiar to skilled artisans.

FIG. 4 further illustrates a schematic diagram suggesting a few examples of how a malicious attacker 70 (represented by a networked device) might utilize the communication system 12 in the vehicle 10 to gain unauthorized access to or breach the system 12. For example, the attacker 70 may utilize external device 60 or similar device which is directly coupled to the bus 14 (e.g., via wire or wireless communication). Or the attacker may spoof an external device 60—i.e., pretend to be a genuine diagnostic tool. Or the attacker 70 may utilize a land network 72 and/or a wireless network 74 to breach the bus 14 (e.g., via the telematics unit or other suitable module 22). In any case, once access to the bus 14 is achieved by the malicious attacker 70, the attacker may communicate with the ECUs 20 in order to gather sensitive information.

For example, the attacker may use known diagnostic protocols (e.g., ISO-14229) to generate a diagnostic request. The attacker's request may be transmitted over the bus 14 to one or more ECUs 20, and the appropriate ECUs may respond with a diagnostic status code. In some instances, where the diagnostic request is requesting sensitive or restricted-access information (e.g., in a range of one or more restricted-access addresses), the response is an OUT-OF-RANGE message. The attacker may learn which addresses 34 are holding sensitive information (e.g., consider the range of addresses in FIG. 3: {H1, I1, . . . , S1} simply by determining which address ranges yield OUT-OF-RANGE messages. Thereafter, the attacker 70 may focus his/her malicious efforts on a limited number of address ranges.

One approach to inhibiting access to malicious attacks may be to dynamically or randomly generate a different response to any status request for addresses containing sensitive information. However, this approach has its weaknesses. For example, the attacker 70 may simply repeatedly query the status of the same address within the same ECU 20; when the attacker receives a different (dynamically-generated) response for each identical query, it becomes apparent (or at least indicative) that the identified address 34 contains sensitive information. Therefore, it is desirable that the response be static—i.e., each time a diagnostic request is made for the status of an address containing sensitive information, the response should be the same. It is also desirable that the response provides non-sensitive information (e.g., unrestricted-access information). And, at least in some instances, the response may be non-sensitive information of an address 34 located elsewhere on the memory 32. In at least one implementation, such responses may be preconfigured or predetermined. For example, prior to any malicious attack, any addresses 34 having sensitive information in each of the ECUs 20 on the bus 14 may be preconfigured with a response of non-sensitive information. In this manner, the response may be sensible or logical to an attacker—and the attacker will either continue to look for memory addresses 34 that appear to be OUT-OF-RANGE or otherwise indicative of sensitive information.

Figure 5:
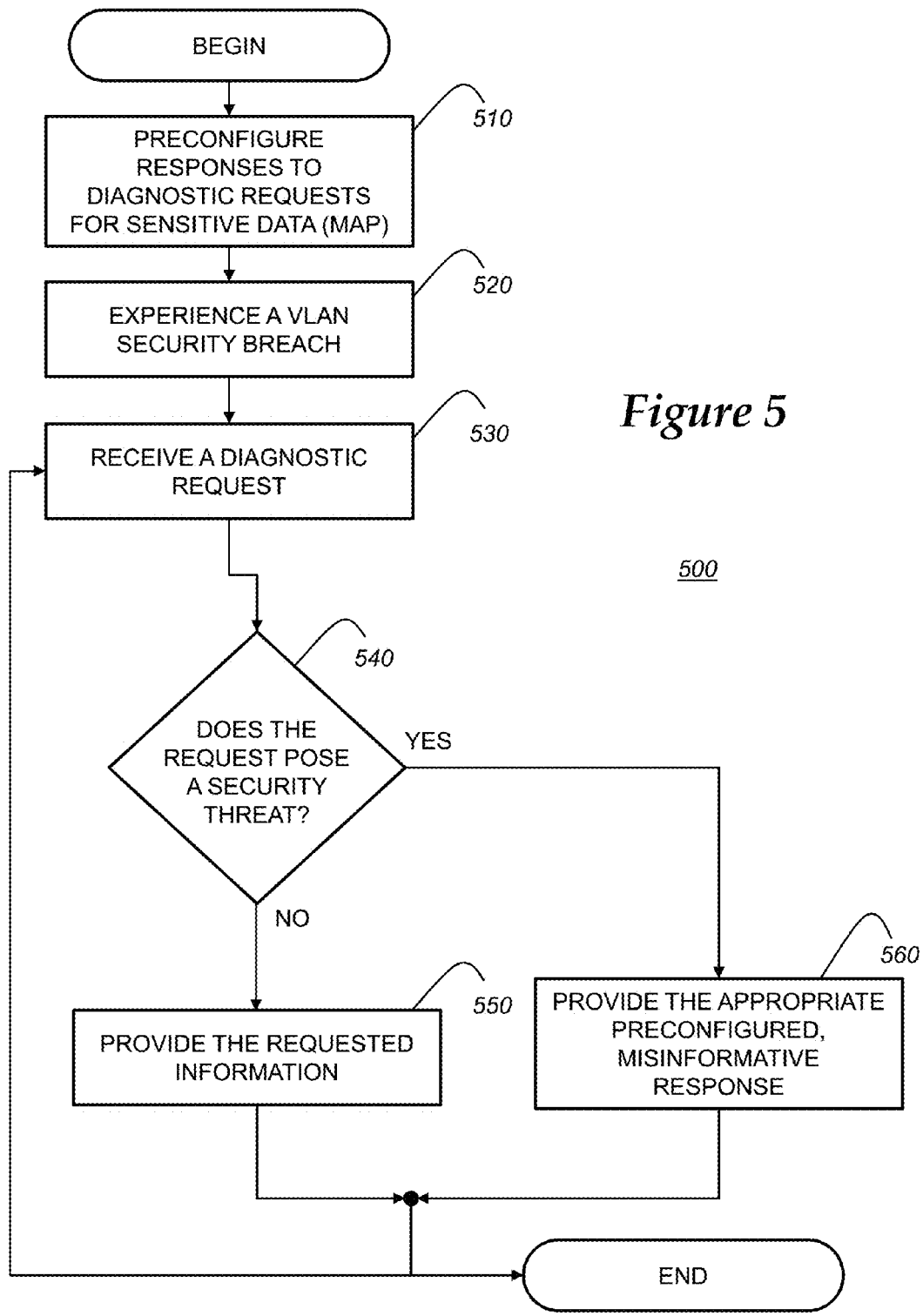
FIG. 5 is a flowchart diagram illustrating a method of secure communication with an ECU on a vehicle bus.

Turning now to FIG. 5, a flowchart diagram is illustrated of a method 500 that can be carried out using the communication system 12. The method begins with step 510 by preconfiguring responses to diagnostic requests for sensitive data. Each address 34 that contains sensitive information may be preconfigured with a response indicating a misinformative response—e.g., a response that purposely misdirects a potential attacker from the sensitive information contained therein. The misinformative response may be associated with a single address 34 or a range of addresses in memory 32. In one implementation, the preconfigured, misinformative responses may be mapped or assigned according to an address map—e.g., using a mapping algorithm or other suitable program. Moreover, the misinformative response may be a response associated with data considered not to be sensitive if intercepted by a malicious attacker. For example, the misinformative response could be associated with the air temperature of the vehicle cabin or remaining life of the engine oil (e.g., before an oil change is due) or any other diagnostic-related data not associated with data that may be used to harm the vehicle occupant or violate the occupant's personally identifiable information or PII (as understood by skilled artisans) or any other like personal information. Step 510 may occur at the time of manufacture, post-manufacture (e.g., at a service center or dealership), or even after-market may an authorized technician.

Following step 510, the method may proceed to step 520—experiencing a VLAN security breach; i.e., using an unauthorized external device 60, an attacker 70 may acquire access to the ECUs 20 and/or bus 14. The phrase 'security breach' should be broadly construed to include any malicious attack, including any attempt to gather or gain information that might indicate a security weakness in the vehicle's network or provide a clue to the attacker how to better attack the network; i.e., a security breach includes both an actual breach as well as any examination of one or more aspects of the vehicle network to determine how to effectuate an actual breach. The breach may not be detected by the components of the VLAN. Thus, in step 520, the attacker 70 may proceed to send diagnostic requests to the various ECUs 20 coupled to the bus 14—e.g., pretending to be an authorized external diagnostic device (e.g., such as a diagnostics device or datalogger).

Thus in step 530, the ECUs 20 receive one or more diagnostic requests (from the unauthorized external device 60). According to one aspect of the method, at least one of the diagnostic requests is for sensitive information associated with a restricted-access address 34 of one of the ECUs 20.

Upon receiving the diagnostic request (step 530), the ECUs 20 (or at least one of the ECUs) may determine whether an increased risk of security breach exists (or is posed) based on the nature of the request (step 540). This determination may include determining whether the diagnostic request is querying information associated within a range of restricted-access addresses 34 (shaded in FIG. 3)—or if a single queried address is designated restricted-access. If the diagnostic request is for non-sensitive information, the method proceeds to step 550 and simply provides an accurate status or response (e.g., provides a status code). However, if the diagnostic request is for an address 34 (or range of addresses) that is associated with sensitive information (i.e., restricted-access), then the method 500 proceeds to step 560.

In step 560, the method provides the appropriate preconfigured, misinformative response. As previously discussed, this response may be defined statically, and the response may appear to be an expected or typical response from a query of a non-sensitive address. Thus, in the event the attacker queries any address 34 of one of the ECUs 20 that contains sensitive information, the attacker receives in response a misinformative response that does not raise suspicion that the address 34 contains sensitive information.

Following steps 550 and/or 560, the method proceeds again to step 530 or ends. In step 530, the method 500 may receive a second diagnostic request. In one instance, the second diagnostic request is the same as the first diagnostic request (previously described); i.e., the diagnostic request queries the same address 34 in the first request as it does in the second request. In this instance, the method proceeds to step 540 and 560—providing the same misinformative response to the second diagnostic request as it did for the first diagnostic request.

However, if the second diagnostic request is not the same as the first request, then the method 500 determines if the request poses a security threat again (step 540). If it is determined that a threat exists (e.g., the request is for an address 34 in a restricted-access range), the method proceeds to step 560 and provides a different, preconfigured misinformative response.

Thus, there has been described method(s) for securely communicating over a vehicle bus. More specifically, the disclosure presents method(s) to inhibit giving indications of where sensitive data is stored on ECU memory to an attacker.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of secure communication between a vehicle and an external device communicating with the vehicle in a diagnostics mode, comprising the steps of:

receiving a first diagnostic request at an electronic control unit (ECU) from the external device;

determining an increased risk of security breach at the ECU based on the first request; and when it is determined that the increased risk exists, providing a misinformative response, wherein the misinformative response purposely misdirects the requesting external device.

2. The method of claim 1, wherein the first diagnostic request is a memory read-request associated with a memory address of the ECU.

3. The method of claim 2, wherein the determining step includes determining whether the memory address is within a range of restricted-access addresses.

4. The method of claim 3, further comprising determining that the memory address is within the range of restricted-access addresses, wherein the providing step includes responding to the first request with non-sensitive data associated with one or more unrestricted-access addresses.

5. The method of claim 4, further comprising the step of preconfiguring the misinformative response prior to receiving the first diagnostic request, wherein the preconfiguration associates the non-sensitive data of at least one unrestricted-access memory address with at least one restricted-access memory address.

6. The method of claim 4, further comprising receiving a second diagnostic request at the ECU, and when the first request is the same as the second request, providing the same misinformative response.

7. The method of claim 4, further comprising receiving a second diagnostic request at the ECU, and when the first request is not the same as the second request, providing a different misinformative response.

8. The method of claim 1, wherein communication between the ECU and external device is according to ISO-14229.

9. The method of claim 8, wherein the first diagnostic request is a Read_Memory_by_Address request.

10. The method of claim 1, wherein the first diagnostic request is part of a malicious attack.

11. The method of claim 1, wherein the misinformative response does not include error code data associated with an out-of-range message.

12. The method of claim 1, wherein the misinformative response is not dynamically generated.

13. A method of secure communication between a vehicle electronic control unit (ECU) and an external device communicating with the ECU in a diagnostics mode, comprising the steps of:

preconfiguring a static, misinformative response to a diagnostic request for sensitive data;

receiving a first diagnostic request from the external device, the first diagnostic request being at least a portion of a malicious attack;

determining that the first diagnostic request is for the sensitive data; and providing the misinformative response, wherein the misinformative response purposely misdirects the requesting external device from the sensitive data.

14. The method of claim 13, further comprising receiving a second diagnostic request requesting the same sensitive data as the first diagnostic request and providing the same misinformative response.

15. The method of claim 13, wherein communication between the ECU and external device is according to ISO-14229.

16. The method of 13, wherein the misinformative response does not include error code data associated with an out-of-range message.

* * * * *